United States Patent
Kasemann et al.

(10) Patent No.: US 6,228,921 B1
(45) Date of Patent: May 8, 2001

(54) PROCESS FOR THE PRODUCTION OF COMPOUNDS BASED ON SILANES CONTAINING EPOXY GROUPS

(75) Inventors: Reiner Kasemann, Schiffweiler; Helmut Schmidt, Saarbrücken, both of (DE); Ertugrul Arpac, Antalya (TR); Volker Gerhard; Elisabeth Geiter, both of Saarbrücken (DE); Georg Wagner, Illingen-Hüttigweiler (DE)

(73) Assignee: Institut für Neue Materialien Gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/429,302

(22) Filed: Oct. 28, 1999

Related U.S. Application Data

(62) Division of application No. 08/635,955, filed as application No. PCT/EP94/03336 on Oct. 10, 1994, now Pat. No. 6,008,285.

(30) Foreign Application Priority Data

Nov. 10, 1993 (DE) ................................. 43 33 361

(51) Int. Cl.$^7$ ........................................ C08J 5/06
(52) U.S. Cl. ..................... 524/381; 524/385; 524/391; 524/405; 524/437; 528/14; 528/20
(58) Field of Search .................... 524/368, 381, 524/385, 391, 405, 437; 528/14, 20

(56) References Cited

U.S. PATENT DOCUMENTS 4,073,967 * 2/1978 Sandvig ................................. 427/44

FOREIGN PATENT DOCUMENTS

WO 94/20581  9/1994 (WO).

OTHER PUBLICATIONS

W. Noll, Chemistry and Technology of Silicones, p. 147, "Chemical Properties".

M. & I. Ash, The Condensed Encyclopedia of Surfactants, p. 182, 1989.

* cited by examiner

Primary Examiner—Robert Dawson
Assistant Examiner—D. Aylward
(74) Attorney, Agent, or Firm—Oblon, Spivak, McClelland, Maier & Neustadt, P.C.

(57) ABSTRACT

A process is disclosed for the production of compounds based on hydrolyzable silanes containing epoxy groups. The process involves adding one of the following substances to a pre-hydrolyzed silicon compound A with at least one hydrolytically non-separable group which includes an epoxy ring:

i) a particulate substance B which can be selected from oxides, oxyhydrates, nitrides or carbides of Si, Al and B, and of transition metals, the particle size being 1–100 nm;

ii) a surface-active agent, preferably non-ionic;

iii) an aromatic polyol with an average molecular weight not exceeding 1000.

The compounds obtained through this process can be used to produce coatings and molded bodies with a range of properties, in particular high scratch resistance, lasting hydrophilic characteristics, corrosion resistance, good adhesion and transparency.

23 Claims, No Drawings

PROCESS FOR THE PRODUCTION OF COMPOUNDS BASED ON SILANES CONTAINING EPOXY GROUPS

Division of 08/635955 filed May 1996 U.S. Pat. No. 6,008,285 which is 371 case of PCT/EP94/03336, filed Oct. 10, 1994.

The present invention relates to a process for the production of compositions based on hydrolyzable silanes having epoxy groups, the compositions obtainable thereby, and the use of said compositions. Particularly, the present invention relates to a process for the production of such compositions for coatings and molded bodies having variable properties.

The prior art shows that it is possible to produce materials suitable for coating purposes via the sol-gel process from alkoxides such as, e.g., aluminum propylate or butylate, additionally using modified alkoxysilanes. Said processes are essentially characterized in that a mixture of the starting components can react to form a viscous liquid phase via a hydrolysis and condensation process. In said synthesis methods an organically modified inorganic basic skeleton is formed, which skeleton, in comparison to conventional polymers, is characterized by an increased surface hardness (scratch hardnesses using a Vickers diamond of 4 to 5 as compared to scratch hardnesses of conventional polymers of a magnitude of 1). However, a decisive disadvantage of said process is that due to the high reactivity of the aluminum-containing component no stable intermediate phases ("living system") can be achieved. Thus, the so-called pot life is limited (depending on the application purpose, between several hours and several days). The longer pot lives are not a consequence of the stability of the system but are to be considered merely a consequence of the application. This means that for different applications in the field of coatings, a relatively wide range of the varying property of the material (viscosity) may be tolerated. As already mentioned, in comparison to organic polymers, said layers have a relatively high hardness but are still relatively soft in comparison to inorganic materials. The reason therefor is that although the inorganic components in the system act strongly crosslinking, due to their very low size (in molecular dimensions, i.e., <1 nm), the mechanical properties such as, e.g., hardness and abrasion resistance, do not manifest themselves. The last mentioned properties are very pronounced in so-called filled polymers since in that case the particles have sizes of several μm. However, the transparency of corresponding materials is lost and applications in the field of optics are not possible anymore. Although small particles of $SiO_2$ (e.g., Aerosil®, DEGUSSA) have successfully been employed for producing transparent layers having increased abrasion resistance, the abrasion resistances achieved with the employable low concentrations are similar to those of the systems mentioned above. The upper limit of the amount of filler is determined by the high surface reactivity of said small particles which results in agglomeration and intolerable increases in viscosity, respectively.

Thus, a first object of the present invention is to provide an organically modified inorganic system which shows a hardness significantly higher than that of the materials described in the prior art and which has a high optical transparency. Moreover, said system should also allow the preparation of stable intermediates which may be applied onto substrates and show properties constant with time as well as the adjustment of variable surface-physical and surface-chemical properties such as hydrophilic property or hydrophobic property in combination with oleophobic property.

In order to protect metallic surfaces against corrosion there are usually employed systems which develop passivating layers and are characterized in that they bond strongly to the surface, e.g., formation of mixed esters or oxides ($Pb_3O_4$ on surfaces of iron, $Cr_2O_3$ on surfaces of aluminum, etc.). By means of said surface compounds the reaction of water in combination with oxygen with the substrate material is prevented, said reaction resulting in a permanent oxidation of the surface layer of the substrate (metal). The protective oxide layers (passivating layers) generally show the further property of not reacting further even in the presence of moisture, but forming passivated surfaces (basic carbonates, hydroxides, oxides). For that reason it is not possible to protect metals such as iron or aluminum against corrosion without prior passivation merely by coating said metals with organic polymer paints. Purely organic paints show the property of being permeable to moisture and oxygen and thus, do not offer any protection against the attack by moisture and oxygen on the metallic surfaces.

The organically modified inorganic coating materials mentioned above on principle show the same disadvantages since due to the presence of organic groups they also allow the diffusion of water and moisture, respectively as well as oxygen through the corresponding layers. Although an improved protection against corrosion may be achieved by certain specific process measures, the corresponding materials are brittle and tend to form microcracks (particularly with variable load bending stress). Said formation of microcracks may damage the surface and corrosion may take place.

Thus, a second object of the present invention is the provision of an organically modified inorganic system suitable for the protection of metallic surfaces against corrosion without concomitantly showing the known disadvantages of corresponding systems such as brittleness, microcracking and poor adhesion to the substrate (metal).

The two objects mentioned above are achieved generically by a process for the production of compositions based on hydrolyzable silanes having epoxy groups, which process is characterized in that it comprises the addition of i) at least one particulate material B, selected from the group of oxides, oxohydrates, nitrides, and carbides of Si, Al and B, as well as of transition metals, preferably Ti and Zr, and having a particle size ranging from 1 to 100 nm, particularly from 2 to 50 nm; and/or ii) a preferably non-ionic surfactant C; and/or iii) an aromatic polyol D having an average molecular weight not exceeding 1000;

to at least one pre-hydrolyzed silicon compound A having at least one hydrolytically unremovable radical directly bonded to Si, which radical includes an epoxide ring, provided that the hydrolysis of compound A may also be conducted in the presence of said material B.

By suitably selecting and optionally suitably combining the above components (i) to (iii) the coatings and molded bodies of the corresponding compositions may be provided with the properties mentioned above alternatively or cumulatively.

Particularly, the combination of the particulate material B with the hydrolyzable silicon compound A results in a composition for highly scratch-resistant coatings and molded bodies. If a composition for coatings and molded bodies of (long-term) hydrophilic property is desired the pre-hydrolyzed silicon compound A is preferably combined with a cationic, anionic or non-ionic surfactant, particularly preferred a non-ionic surfactant.

Finally, the combination of pre-hydrolyzed silicon compound A and aromatic polyol D results in a composition for corrosion-inhibiting coatings.

Obviously, one or both of the remaining components (i) to (iii) may be incorporated in each of the three basic types of compositions mentioned above, only provided that the composition for the corrosion-inhibiting coatings should not contain any surfactant C.

Thus, for example, in the composition for hydrophilic coatings and molded bodies, said particulate material B and/or said aromatic polyol D may additionally be incorporated in order to provide the corresponding coatings and molded bodies with a still better scratch resistance (particulate material B) or additionally an improved condensation water resistance (polyol D).

In the case of the composition for the corrosion-inhibiting coatings the additional incorporation of the particulate material B results in a higher scratch resistance of the corresponding coat. Furthermore, a hydrolyzable silicon compound having at least one non-hydrolyzable radical which has 5 to 30 fluorine atoms bonded to carbon atoms which are separated from Si by at least two atoms may additionally be incorporated into the compositions for highly scratch-resistant and corrosion-inhibiting coatings. The use of such a fluorinated silane results in the corresponding coat being additionally provided with hydrophobic and oleophobic (soil-repellant) properties.

Particularly in the case of the compositions for hydrophilic coatings and molded bodies and corrosion-inhibiting coatings, it is moreover preferred to additionally use a Lewis base E or an alcoholate F of Ti, Zr or Al as catalyst for the epoxide-epoxide and polyol-epoxide crosslinking, respectively. In the case of compositions for (long-term) hydrophilic coatings and molded bodies the use of a (non-ionic) surfactant C may even be dispensed with if such a component E or F is employed. However, this results in the corresponding coatings and molded bodies not being provided with excellent anti-fogging properties.

In the case of compositions for hydrophilic coatings and molded bodies the surfactant may be employed not only in the reaction mixture, but may also be thermally diffused into the corresponding coating later. In this context it should also be mentioned that the use of non-fluorinated and non-perfluorinated, respectively surfactants is preferred.

Furthermore, in the case of all of the above compositions, the silicon compound A is not necessarily employed individually, but additionally one or more further hydrolyzable compounds H of elements forming an inorganic network, particularly from the group of Si, Ti, Zr, Al, B, Sn and V, may be hydrolyzed together with said compound A.

In the following the species A to H mentioned above will be explained in more detail.

Silicon Compound A

The silicon compound A is a silicon compound having 2 or 3, particularly 3, hydrolyzable radicals and one or 2, particularly one, non-hydrolyzable radicals. The only or at least one, respectively of said two non-hydrolyzable radicals includes an epoxide ring.

Examples for the hydrolyzable radicals are halogen (F, Cl, Br and I, particularly Cl and Br), alkoxy (particularly $C_{1-4}$ alkoxy such as, e.g., methoxy, ethoxy, n-propoxy, i-propoxy, and butoxy), aryloxy (particularly $C_{6-10}$ aryloxy, e.g., phenoxy), acyloxy (particularly $C_{1-4}$ acyloxy such as, e.g., acetoxy and propionyloxy), and alkylcarbonyl (e.g., acetyl). Particularly preferred hydrolyzable radicals are alkoxy groups, particularly methoxy and ethoxy.

Examples for non-hydrolyzable radicals without epoxide ring are alkyl, particularly $C_{1-4}$ alkyl (such as, e.g., methyl, ethyl, propyl, and butyl), alkenyl (particularly $C_{2-4}$ alkenyl such as, e.g., vinyl, 1-propenyl, 2-propenyl, and butenyl), alkynyl (particularly $C_{2-4}$ alkynyl such as, e.g., acetylenyl and propargyl), and aryl (particularly $C_{6-10}$ aryl such as, e.g., phenyl and naphthyl), the above-mentioned groups optionally having one or more substituents such as, e.g., halogen and alkoxy. Methacryl and methacryloxypropyl radicals may also be mentioned in the present context.

Examples of non-hydrolyzable radicals having an epoxide ring are particularly those which have a glycidyl and glycidyloxy group, respectively.

Specific examples of silicon compounds A which may be employed according to the present invention may be found, e.g., on pages 8 and 9 of EP-A-195493.

According to the present invention, particularly preferred silicon compounds A are those of general formula (I):

$$R_3SiR' \qquad (I)$$

wherein the radicals R, the same or different from each other (preferably the same), represent a hydrolyzable group (preferably $C_{1-4}$ alkoxy, and particularly methoxy and ethoxy) and R' is a glycidyloxy-($C_{1-6}$)-alkylene radical.

Due to its ready availability, the use of γ-glycidyloxypropyl trimethoxysilane (in the following abbreviated as GPTS) is particularly preferred according to the present invention.

The silicon compound(s) A are hydrolyzed preferably by using a catalyst. Said catalyst should be an acidic catalyst since basic catalysts also act as condensation catalysts. A preferred acidic catalyst is aqueous HCl. In this case, the hydrolysis is preferably carried out by using M mole of $H_2O$ per mole of hydrolyzable radical.

Particulate Material B

The particulate material B is an oxide, oxohydrate, nitride or carbide of Si, Al and B, as well as of transition metals, preferably Ti and Zr, having a particle size ranging from 1 to 100, preferably from 2 to 50 nm, and particularly preferred from 5 to 20 nm. Said material may be used in the form of a powder but preferably is employed in the form of a sol (particularly an acid-stabilized sol). Preferred particulate materials are boehmite and $ZrO_2$ and $TiO_2$ as well as titanium nitride. Particularly preferred are boehmite particles in the nanoscale range. Said particulate materials are commercially available as powders and the preparation of (acid-stabilized) sols therefrom is also known in the prior art. Furthermore, the preparation examples given below may be referred to in this context. The principle of stabilizing titanium nitride in the nanoscale range by means of guanidino-propionic acid is described, for example, in German patent application P 43 34 639.1.

The variation of the particles in the nanoscale range is usually accompanied by a variation of the refractive index of the corresponding materials. Thus, the replacement of boehmite particles by $ZrO_2$ and $TiO_2$ particles, respectively affords materials having higher refractive indices, the refractive index resulting in an additive manner from the volume of the component having the high refractive index and of the matrix according to the Lorentz-Lorenz equation.

Particularly, if highly scratch-resistant properties are desired, said particulate material B may be used in an amount of up to 50% by wt., based on the solids content of the matrix. Generally, the amount of particulate material B, when employed in the above compositions, ranges from 1 to 50, particularly from 3 to 40, and particularly preferred from 5 to 30% by wt., based on the solids content of the matrix.

Surfactant C

Surfactant C, which preferably is employed in the above compositions for the production of long-term hydrophilic coatings and molded bodies because it results in a long-term anti-fogging effect (and in comparison to the use of a Lewis base alone also to a higher hydrophilic property of the corresponding material), is preferably a non-ionic (non-perfluorinated) surfactant.

Particularly preferred are non-ionic surfactants which are liquid at room temperature. As already mentioned above, the surfactants may not only be added during the preparation of the composition, but may also be thermally diffused into said composition afterwards, preferably in aqueous solution at about 50–80° C. Preferred non-ionic surfactants are polyoxyethylene ethers of varying chain lengths (e.g., Brij® 92, Brij® 96, Brij® 98, of Messrs. ICI), polyoxyethylene cetylether of varying chain lengths (e.g., Malipal® 24/30 to 24/100, of Messrs. Hüls, and Disponil®, of Messrs. Henkel), sodium laurylsulfate (e.g., Sulfopon® 101 Spezial, of Messrs. Henkel), laurylpyridinium chloride (e.g., Dehydquad C Christ®, of Messrs. Henkel), and polyoxyethylene sorbitan monooleate (e.g., Tween® 80, of Messrs. Riedl de Haen). Particularly preferred are polyoxyethylene oleylcetylethers and poly-oxyethylene oleylethers.

In the above compositions for long-term hydrophilic coatings and molded bodies the surfactant is generally employed in an amount of 0.1 to 35% by wt., based on the solids content of the composition. Preferred amounts range from 1 to 20, and particularly from 2 to 10% by wt.

Aromatic Polyol D

The aromatic polyol D employed according to the present invention has an average molecular weight of not more than 1000. Examples of such aromatic polyols are, e.g., polyphenylene ethers having hydroxy groups bonded to at least 2 of the phenyl rings, as well as in general compounds (oligomers) wherein the aromatic rings are connected to each other by a single bond, —O—, —CO—, —SO$_2$—, etc., and have at least (and preferably) two hydroxy groups bonded to aromatic groups.

Particularly preferred aromatic polyols are aromatic diols. Among said aromatic diols compounds having the general formulae (II) and (III) are particularly preferred:

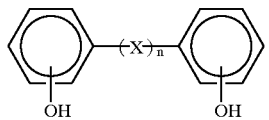

(II)

wherein X represents a (C$_1$–C$_8$) alkylene or alkylidene radical, a (C$_6$–C$_{14}$) arylene radical, —O—, —S—, —CO— or —SO$_2$—, and n is 0 or 1;

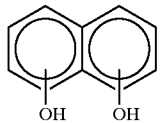

(III)

Preferred meanings for X in formula (II) are C$_1$–C$_4$ alkylene or alkylidene, particularly —C(CH$_3$)$_2$— and —SO$_2$—. In the compounds of formulae (II) and (III) the aromatic rings may carry up to 4 and 3, respectively further substituents such as halogen, alkyl and alkoxy in addition to the OH groups.

Specific examples of compounds of formula (II) and (III) are bisphenol A, bisphenol S, and 1,5-dihydroxynaphthalene. Among said compounds bisphenol A is particularly preferred according to the present invention.

In the compositions for corrosion-inhibiting coatings the polyol (diol) is generally employed in amounts such that 0.2 to 1.5 moles of hydroxy groups from the aromatic polyol D are present per mole of epoxide ring from the silicon compound A. Preferably, 0.3 to 1.2, particularly preferred 0.6 to 1 mole of hydroxyl groups from the polyol D are present per mole of epoxide ring, the optimum value being 0.8 moles of OH per mole of epoxy.

If aromatic polyols having more than two OH groups are employed instead of aromatic diols, the corresponding materials become more brittle but in turn also harder. Finally, it should also be mentioned that the aromatic polyols may partly or completely be replaced by aliphatic polyols having a comparable pKa value, although this is not preferred.

It should also be mentioned that the refractive index of the corresponding corrosion-inhibiting coatings may be controlled not only by the concentration and type of the particulate materials B (if said materials are employed at all), but also by the selection of the corresponding aromatic polyol. Thus, for example, a coating using bisphenol S has a higher refractive index than a coating based on bisphenol A.

As mentioned above, also in the production of compositions for hydrophilic coatings and molded bodies, aromatic polyols D may be used in small amounts in order to improve the condensation water resistance of the corresponding materials. In this case, the upper limit of the concentration of component D is about 10 mole %, based on the epoxy groups of the silicon compound(s) A employed. If higher amounts are used the ability of the surfactants to diffuse is decreased which may result in a reduction and loss, respectively of the anti-fogging properties.

Lewis Base E

The Lewis base E which is employed particularly in the compositions for hydrophilic and corrosion-inhibiting materials is preferably a nitrogen compound. Such nitrogen compounds may, for example, be selected from N-heterocycles, amino group-containing phenols, polycyclic amines and ammonia (preferably as aqueous solution). Specific examples thereof are 1-methyl-imidazole, 2-(N,N-dimethylaminomethyl)phenol, 2,4,6-tris- (N,N-dimethylaminomethyl)phenol and1,8-diazabicyclo[5.4.0]-7-undecene. Particularly preferred among said compounds is 1-methylimidazole.

A further class of nitrogen-containing Lewis bases which may be employed according to the present invention are hydrolyzable silanes having at least one non-hydrolyzable radical comprising at least one primary, secondary or tertiary amino group. Such silanes may be hydrolyzed together with the silicon compound A and in this case represent a Lewis base incorporated into an organically modified inorganic network. Preferred nitrogen-containing silicon compounds are those of general formula (IV):

$$R_3SiR''$$ (IV)

wherein the radicals R are defined as in the case of general formula (I) above, and R" represents a non-hydrolyzable radical bonded to Si and comprising at least one primary, secondary or tertiary amino group. Specific examples for such silanes are 3-aminopropyl-trimethoxysilane, 3-aminopropyl-triethoxysilane, N-(2-aminoethyl)-3-aminopropyl-trimethoxy-silane, N-[N'-(2'-aminoethyl)-2-aminoethyl]-3-aminopropyl-trimethoxysilane, and N-[3-(triethoxysilyl)-propyl]-4,5-dihydroimidazole.

The Lewis base is employed in the corresponding compositions generally in an amount of from 0.01 to 0.5 moles per mole of epoxy group of silicon compound A. Amounts ranging from 0.02 to 0.3, and particularly from 0.05 to 0.1 moles of Lewis base per mole of epoxy group are preferred.

As already mentioned above, the use of a (non-ionic) surfactant in the compositions for hydrophilic materials may be dispensed with if a Lewis base is employed instead. However, this has the disadvantage that thereby usually the long-term anti-fogging properties of the corresponding coatings are lost and is not preferred, therefore.

Alcoholate F

The alcoholate F of Ti, Zr or Al employable instead of (or in addition to) the Lewis base E preferably is one of general formula (V)

$$M(OR''')_m \quad (V)$$

wherein M is Ti, Zr or Al, R represents an alkyl group having preferably 1 to 4 carbon atoms (e.g., methyl, ethyl, propyl, isopropyl or butyl), and n is 4 (M=Ti, Zr) or 3 (M=Al).

As regards the amounts of employable alcoholate F, the same as in the case of the Lewis base E applies.

Fluorine-containing silicon compound G

The hydrolyzable fluorinated silanes G additionally employable in the compositions for highly scratch-resistant and corrosion-inhibiting coatings are those which have at least one non-hydrolyzable radical having 5 to 30 fluorine atoms bonded to carbon atoms separated from Si by at least two atoms. Such silanes are described in detail in DE-OS 4118184. Specific examples thereof are the following:

$C_2F_5CH_2$—$CH_2$—$SiY_3$ n—$C_6F_{13}CH_2CH_2$—$SiY_3$ n—$C_8F_{17}CH_2CH_2$—$SiY_3$ n—$C_{10}F_{21}CH_2CH_2$—$SiY_3$ (Y=$OCH_3$, $OC_2H_5$ or Cl)

i—$C_3F_7O$—$(CH_2)_3$—$SiCl_2(CH_3)$ n—$C_6F_{13}CH_2CH_2SiCl_2(CH_3)$ n—$C_6F_{13}CH_2CH_2SiCl(CH_3)_2$

Said fluorinated silanes are generally employed in an amount of from 0.1 to 15%, preferably from 0.2 to 10%, and particularly preferred from 0.5 to 5% by wt., based on the solids content of the organically modified inorganic matrix.

Hydrolyzable compounds H employable in addition to silicon compound A

Besides the silicon compound A, also other hydrolyzable compounds of elements from the group of Si, Ti, Zr, Al, B, Sn, and V may be used to prepare the compositions according to the present invention and preferably hydrolyzed together with the silicon compound(s). The amount of such additional compounds H should, however, not exceed 70% by moles, and particularly 50% by moles of the total of hydrolyzable compounds employed, it being particularly preferred if not more than 30%, and particularly not more than 10% by moles of the total of hydrolyzable compounds employed are different from the silicon compound(s) A.

Specific examples of employable compounds H are given in the following, although these compounds must not be construed as a limitation of the employable compounds H.

$Si(OCH_3)_4$, $Si(OC_2H_5)_4$, $Si(O$—n— or i—$C_3H_7)_4$ $Si(OC_4H_9)_4$, $SiCl_4$, $HSiCl_3$, $Si(OOCCH_3)_4$ $CH_3$—$SiCl_3$, $CH_3$—$Si(OC_2H_5)_3$, $C_2H_5$—$SiCl_3$, $C_2H_5$—$Si(OC_2H_5)_3$, $C_3H_7$—$Si(OCH_3)_3$, $C_6H_5$—$Si(OCH_3)_3$, $C_6H_5$—$Si(OC_2H_5)_3$, $(CH_3O)_3$—$Si$—$C_3H_6$—$Cl$, $(CH_3)_2SiCl_2$, $(CH_3)_2Si(OCH_3)_2$, $(CH_3)_2Si(OC_2H_5)_2$, $(CH_3)_2Si(OH)_2$, $(C_6H_5)_2SiCl_2$, $(C_6H_5)_2Si(OCH_3)_2$, $(C_6H_5)_2Si(OC_2H_5)_2$, (i—$C_3H_7)_3SiOH$, $CH_2$=$CH$—$Si(OOCCH_3)_3$ $CH_2$=$CH$—$SiCl_3$ $CH_2$=$CH$—$Si(OCH_3)_3$, $CH_2$=$CH$—$Si(OC_2H_5)_3$, $CH_2$=$CH$—$Si(OC_2H_4OCH_3)_3$, $CH_2$=$CH$—$CH_2$—$Si(OCH_3)_3$, $CH_2$=$CH$—$CH_2$—$Si(OC_2H_5)_3$, $CH_2$=$CH$—$CH_2$—$Si(OOCCH_3)_3$, $CH_2$=$C(CH_3)$—$COO$—$C_3H_7$—$Si(OCH_3)_3$, $CH_2$=$C(CH_3)$—$COO$—$C_3H_7$—$Si(OC_2H_5)_3$, $Al(OCH_3)_3$, $Al(OC_2H_5)_3$, $Al(O$—n—$C_3H_7)_3$, $Al(O$—i—$C_3H_7)_3$, $Al(OC_4H_9)_3$, $Al(O$—i—$C_4H_9)_3$, $Al(O$-sec-$C_4H_9)_3$, $AlCl_3$, $AlCl(OH)_2$, $Al(OC_2H_4OC_4H_9)_3$, $TiCl_4$, $Ti(OC_2H_5)_4$, $Ti(OC_3H_7)_4$, $Ti(O$—i—$C_3H_7)_4$, $Ti(OC_4H_9)_4$, $Ti(2$-ethylhexoxy$)_4$;

$ZrCl_4$, $Zr(OC_2H_5)_4$, $Zr(OC_3H_7)_4$, $Zr(O$—i—$C_3H_7)_4$, $Zr(OC_4H_9)_4$, $ZrOCl_2$, $Zr(2$-ethylhexoxy$)_4$, as well as compounds of Zr which have complexing radicals such as, e.g., β-diketone and methacryl radicals, $BCl_3$, $B(OCH_3)_3$, $B(OC_2H_5)_3$, $SnCl_4$, $Sn(OCH_3)_4$, $Sn(OC_2H_5)_4$, $VOCl_3$, $VO(OCH_3)_3$.

As apparent, said compounds H (particularly the silicon compounds) may also have non-hydrolyzable radicals having a C—C double or triple bond. If such compounds are employed together with (or even instead of) said silicon compounds A, additionally also (preferably epoxy or hydroxy group-containing) monomers such as, e.g., (meth) acrylates may be incorporated into the composition (obviously said monomers may also have two or more functional groups of the same type such as, e.g., poly(meth) acrylates of organic polyols; the use of organic polyepoxides is possible as well). In this case, in the thermally or photochemically induced curing of the corresponding composition, a polymerization of the organic species takes place in addition to the formation of an organically modified inorganic matrix whereby the cross-linking densitiy and thus, also the hardness of the corresponding coatings and molded bodies is increased.

In passing it should also be mentioned that the use of silicon compounds (A) having at least two epoxide groups in the compositions according to the present invention results in coatings and molded bodies having improved condensation water stability.

The production of the compositions according to the present invention is carried out in a manner conventional in the art. Preferably the hydrolyzable silicon compound A is hydrolyzed (at room temperature) first, preferably using an acidic catalyst. As mentioned above, in this case, preferably ½ mole of $H_2O$ is employed per mole of hydrolyzable group. Said hydrolysis is followed by the addition of the further components in any sequence. However, if the particulate material B is employed, the hydrolysis may also be effected, e.g., in the presence of said particulate material B.

If in addition to the silicon compounds which react relatively sluggishly also compounds H of higher reactivity are employed (e.g., compounds of Ti, Zr and Al), it is recommendable to add the water in portions and/or with ice cooling and/or to employ compounds which have been rendered less reactive due to complexation (as in the case of, e.g., $Al(OCH_2CH_2OC_4H_9)_3$).

In order to adjust the rheological properties of the compositions inert solvents may optionally be added to the latter in any preparation step (preferably said solvents are alcohols which are liquid at room temperature and which, by the way, also are formed in the hydrolysis of the preferably employed alkoxides of the corresponding elements), it being also possible for said alcohols to contain ether groups.

Furthermore, conventional additives may be incorporated into the compositions according to the present invention, such as, e.g., coloring agents, levelling agents, UV stabilizers, photoinitiators, photosensitizers (if a photochemical curing of the composition is intended), and thermal polymerization catalysts. In the case of coating compositions, the application onto the substrate may be effected by standard coating methods such as, e.g., dip-coating, surface application, brushing, doctor blade coating, roller coating, spray coating, and spin coating.

Thereafter, a curing (condensation) is carried out, optionally subsequent to a drying operation at room temperature (to partially remove the solvent). Preferably, the curing is carried out thermally at a temperature in the range of from 50 to 300° C., particularly from 70 to 200° C., and particularly preferred from 90 to 130° C., optionally under reduced pressure. However, in the case of the incorporation of unsaturated compounds and photoinitiators, irradiation curing, optionally followed by a thermal post-curing, may also be effected.

The compositions according to the present invention are particularly suitable as coating compositions, usual layer thicknesses being, e.g., from 1 to 30, particularly from 3 to 15 μm.

The corresponding coatings are characterized, apart from a high transparency, particularly by a high scratch resistance (especially when using the particulate material B), a long-term hydrophilic performance (due to the acid catalyzed hydrolysis) which may even be enhanced by using (non-ionic) surfactants (which also afford excellent anit-fogging properties), soil-repellent properties (if additionally fluorinated silanes are employed), and excellent corrosion-inhibiting properties (in the case of using aromatic polyols D), respectively. Accordingly, they are particularly suited for the coating of transparent materials such as glass (for glasses) and transparent plastics (e.g., polycarbonate, polymethyl methacrylate, polystyrene, polyethylene terephthalate and ABS resin), and additionally for the coating of metals or metallized surfaces, respectively. In this context, aluminum, silver, brass, magnesium and iron as well as zinc-coated surfaces, particularly aluminum and magnesium, may specifically be mentioned. It should also be mentioned here that the corrosion-inhibiting compositions according to the present invention show the described excellent properties even on surfaces which have been cleaned by means of alkaline surfactants (e.g., Almeco®, Messrs. Henkel) only. This is a substantial advantage in comparison to the conventional corrosion-inhibiting layers for which generally environmentally relevant etching and chromating processes are required.

The following examples are to further illustrate the present invention without, however, being a limitation of the scope thereof.

I. Synthesis of highly scratch-resistant coating materials

EXAMPLE I.1.

a) Preparation of boehmite sol:

Boehmite powder (Disperal® Sol P3, Messrs. Condea, distribution maximum 20 nm, 12.82 g) was dispersed in 160 g of an ethanol-water mixture (1:1 by weight). The resulting suspension was sonicated for 20 minutes, followed by the addition of 25 g of acetic acid which resulted in a clear solution which subsequently was stirred for about 20 minutes at room temperature. In order to minimize the water content in the solution, 226.23 g of ortho-methylformate were added to said clear solution, whereafter the resulting reaction mixture was stirred for about 2 hours at room temperature and was then concentrated by vacuum distillation to ⅓ of its volume. The addition of 60 ml of ethanol resulted in a transparent solution of low viscosity. (The replacement of the free water by ethanol described herein is preferred in order to avoid long curing times due to the required evaporation of high amounts of water in the final composition).

b) Preparation of coating sol:

To a mixture of 118.17 g of GPTS and 62.50 g of tetraethyl methoxysilane (in the following referred to as TEOS) which had been prehydrolyzed with 24.30 g of 0.1 N HCl (duration of hydrolysis: 19 hours), the boehmite sol was added dropwise under ice cooling. Upon adding 170 ml of 1-butanol, the resulting turbid reaction mixture became clear to form a transparent, colorless sol. The pot life of said material was more than 60 days.

The coating sol was applied onto substrate surfaces by means of standard coating processes such as spin or dip coating. The curing of the coating material was conducted by thermal treatment at 90° to 130° C. (curing time: 4 hours). Correspondingly prepared coatings on transparent plastic materials such as, e.g., PC, PMMA, PS, PET, and ABS showed a good adhesion and a high transparency. The scratch hardnesses (Vickers diamond) determined as a measure of the wear resistance were in the range of 40–60 g (scratch hardness of the plastic materials: <1 g).

EXAMPLE I.2 a) Preparation of boehmite sol:

To 26.84 g of butoxyethanol there were added 12.82 g of acetic acid-stabilized boehmite powder (6.4% by wt. of acetic acid). The resulting colorless suspension was sonicated for 20 minutes and subsequently 95.53 g of 0.1 N HCl were added thereto, resulting in a clear solution which could be directly employed for the preparation of the coating sol.

b) Preparation of coating sol:

The boehmite sol prepared above was slowly added with ice cooling to 180.67 g of the GPTS/TEOS mixture which had been prehydrolyzed analogously to Example I.1. The addition of 60 ml of 1-butanol resulted in a transparent, colorless coating sol which was applied onto substrate surfaces like in Example I.1 (pot life ≧4 months when stored at 4° C.). The curing of the coating material was effected at 80 to 100° C. and 10 kPa (curing time: 4 hours). As coating materials for plastic substrates (see Example I.1), the layers showed high transparency and good adhesion. The scratch hardnesses of the coatings ranged from 40 to 50 g.

EXAMPLE I.3 a) Preparation of boehmite sol:

To 12.82 g of acetic acid-stabilized boehmite powder (6.4% by wt. of acetic acid) there were added 104.62 g of 0.1 N HCl. The subsequent sonication treatment (20 minutes) resulted in a transparent, colorless solution which was directly employed for the preparation of the coating sol.

b) Preparation of coating sol:

The boehmite sol prepared above was added dropwise, under ice cooling, to 180.67 g of a GPTS/TEOS mixture prehydrolyzed as in Example I.1. The formed turbid reaction mixture was stirred for about 30 minutes at room temperature until it became clear. The coating sol (pot life ≧3 months) was then applied onto substrates analogously to Example I.1. The thermal curing was carried out analogously to Example I.2. The coating material was characterized by a high transparency. Coatings on transparent plastic materials showed a good adhesion and a high scratch resistance (scratch hardnesses 50 to 60 g).

EXAMPLE I.4 a) Preparation of boehmite sol:

The procedure of Example I.3 (a) was followed.

b) Preparation of coating sol:

A mixture consisting of 118.17 g of GPTS and 62.50 g of TEOS was added, under ice cooling, to the above boehmite sol. The resulting turbid solution was stirred at room temperature for about 30 minutes and subsequently 74 ml of 1-butanol were added thereto, which resulted in the reaction mixture becoming slowly clear. The pot life was ≧2 months. Coating and curing were conducted analogously to Example I.1. When applied to plastic substrates the coating system showed good optical quality and high adhesion. The scratch hardnesses ranged from 30 to 40 g.

EXAMPLE I.5 a) Preparation of boehmite sol:

The preparation of the boehmite sol was effected as described in Example I.3 (a).

b) Preparation of coating sol:

The above boehmite sol (24.3 g) was added to a mixture consisting of 118.17 g of GPTS and 62.50 g of TEOS. The reaction mixture was stirred at room temperature for 2 hours and subsequently 18.93 g of aluminum tributoxyethanolate were added thereto under ice cooling. The resulting clear sol was stirred for 2 hours at room temperature and then, 93.14 g of the above boehmite sol and 79.30 g of butoxyethanol were added thereto under cooling with ice. The pot life was several months when stored at 4° C. The transparent coating sol was applied onto substrates analogously to Example I.1 and cured thermally at 90° C. for 4 hours. The coatings on transparent plastic materials thus prepared showed good optical quality and adhesion as well as a very high mechanical wear resistance (scratch hardnesses from 100 to >120 g).

II. Synthesis of hydrophilic coating materials

EXAMPLE II.1

To 23.63 g of GPTS there were added 2.70 g of 0.01 M hydrochloric acid at room temperature and under stirring. After 1 hour, 0.411 to 0.821 g of 1-methylimidazole were added to the mixture which after a few seconds turned into a single phase slightly exothermically, whereafter stirring was continued for a further 30 minutes. Then 0.12 g (3% by wt.) of a non-ionic surf actant were added. There were, for example, employed surfactants of the Malipal® type (Hüls) or Disponil® 05 and Dehydrol® LS7 (Henkel), respectively.

After having been stirred for 10 minutes, the transparent, slightly yellowish sol could be applied onto substrate surfaces by standard coating methods (spin-coating, dip-coating, doctor blade-coating, spraying, roller-coating). Organic polymers and glass were used as substrates. The curing of the coating material was effected by thermal treatment at 130° C. for 1 hour in the case of glass, and treatment at 90° C. for 1.5 hours in the case of organic polymers. The coatings were transparent, scratch- and abrasion-resistant and were characterized by a lasting hydrophilic surface and an anti-fogging effect, respectively. The adhesion was very good.

EXAMPLE II.2

A mixture of 21.26 g of GPTS, 1.24 g of (3-methacryloyloxypropyl)trimethoxysilane and 1.14 g of tetraethyl titanate or 1.64 g of zirconium(IV) propylate was heated to reflux in 15 ml of ethanol. To said solution 10 ml of ethanolic 1 M hydrochloric acid were added, said addition being conducted with four portions of 2.5 ml in 30 minute intervals, and the solution was refluxed for a further 2 hours. Subsequently, the solvent was stripped at 70° C. under reduced pressure. To the clear, slightly viscous precondensate 7.2 g of diluted hydrochloric acid (pH 3) were added, and the mixture was stirred at 80° C. for a further 30 minutes. The resulting clear sol was concentrated at 70° C. under reduced pressure so that mixing with the methacrylates to be added and a subsequent coating operation were still possible. To said sol there were added between 6.02 and 32.79 g of a mixture consisting of 2-hydroxyethyl methacrylate and 2-ethyl-2-(hydroxymethyl)-1,3-propanediol trimethacrylate (molar ratio 95:5), 1% by wt. of 2-hydroxycyclohexyl phenylketone as photoinitiator and 3% by wt. of non-ionic surfactants (as in Example II.1). The coating sol could be applied onto the surfaces of polymeric or glass substrates by the standard coating methods mentioned in Example II.1. Curing was conducted in two steps: first a UV-induced polymerization was carried out, followed by a thermal post-treatment at 130° C. for 1 hour.

EXAMPLE II.3 a) Preparation of boehmite sol:

Acetic acid-stabilized boehmite powder (6.4% by wt. of acetic acid; 10.4 g) was dispersed in 250 g of an ethanol/water mixture (1:1 by wt.). To the suspension formed there were added 7.7 g of acetic acid and stirring was conducted for several hours under reflux, whereby a translucent, slightly viscous sol was formed. In order to reduce the water content of said sol 2 liters of absolute ethanol were added, and the initial volume was restored by distillation under reduced pressure.

b) Preparation of coating sol:

At room temperature, 2.70 g of 0.01 M hydrochloric acid were added to 23.63 g of GPTS under stirring. After 1 hour, 0.6 g of 1-methylimidazole were added to said mixture, followed by stirring for another 30 minutes. Subsequently, 3 g of said boehmite sol and 0.15 g (4% by wt.) of a non-ionic surfactant were added sequentially. The non-ionic surfactants given in Example II.1 were used for said purpose. The coating sol could be applied onto the surfaces of polymeric or glass substrates by standard coating methods, optionally subsequent to the filtration of materials causing cloudiness. Curing was effected by means of a thermal treatment at 130° C. for 1 hour.

EXAMPLE II.4

The process of Example II.3 was repeated, omitting, however, the addition of a surfactant. The layers formed were transparent, showed a good adhesion, e.g., on glass surfaces as well as hydrophilic properties (contact angle $H_2O$: 35°) but no lasting anti-fogging effect.

EXAMPLE II.5

The process of Example II.3 was repeated, except for the addition of 2.3 g (9.2% by moles, based on GPTS) of bisphenol A under stirring after the hydrolysis of said GPTS and prior to the addition of said 1-methylimidazole. The transparent layers showed a very good adhesion to surfaces of glass and polycarbonate, complete transparency, anti-fogging properties (DIN 4646, part 8) as well as lasting resistance in the condensation water test according to DIN 50017.

III. Synthesis of corrosion-inhibiting coating materials

EXAMPLE III.1 a) Preparation of boehmite sol:

Boehmite powder (Disperal® P3, Messrs. Condea, 3.1 g) was suspended in 12.0 g of ethanol, and 27.0 g of 0.1 N HCl were added thereto. After stirring the solution for 16 hours a clear solution was obtained.

b) Preparation of coating sol:

Under stirring, 1.20 g of 0.1 N HCl were added to 23.63 g of GPTS. After 1 minute, 2.35 g of the above boehmite sol were added to the resulting prehydrolysate and stirring was conducted at room temperature for 1 hour. Subsequently, a solution consisting of 9.12 g of bisphenol A and 0.82 g of 1-methylimidazole in 12 g of butoxyethanol was added and stirring was continued for 30 minutes. The transparent sol obtained could be applied onto substrate surfaces by means of standard coating methods (dip- and spin-coating, doctor blade-coating, spraying, roller-coating), optionally subsequent to the adjustment of the rheological properties by adding suitable solvents (usually alcohols). The thermal curing of the layers may be conducted between 80° and 200° C., particularly between 100° and 130° C. The curing times ranged from 2 hours to 5 minutes, depending on the curing temperature. The pot lives of the coating materials were several weeks when stored at about 0° C. The layers produced were highly transparent and showed a very good adhesion to metallic surfaces (particularly of aluminum, magnesium and brass). The scratch hardness of said materials (modified Erichsen test) ranged from 40 to 50 g at layer thicknesses between 15 and 20 $\mu$m.

EXAMPLE III.2 a) Preparation of boehmite sol:

Boehmite powder (Disperal® Sol P3, 3.3 g) was suspended in 25.0 g of 0.1 N hydrochloric acid and stirred for 24 hours, whereafter a clear solution was obtained.

b) Preparation of coating sol:

To a mixture consisting of 23.63 of GPTS and 4.48 g of 3-aminopropyl-trimethoxysilane 1.50 g of 0.1 N hydrochloric acid were added under stirring. After 15 minutes, 2.15 g of the above boehmite sol were added to the resulting prehydrolysate, whereafter stirring was conducted at room temperature for 1 hour. Subsequently, a solution consisting of 10.0 g of bis(4-hydroxyphenyl)sulfone (bisphenol S) in 40 g of ethanol was added, followed by stirring for another 30 minutes. The sol obtained could be applied onto substrates by the standard coating methods given in Example III.1; the thermal curing of the layers was conducted at 130° C. within 1 hour. The layers obtained showed excellent scratch and abrasion resistance on Al, Mg, brass and Ag, were transparent and showed a good adhesion. In the case of layers on silver the coating prevented "tarnishing" (formation of $Ag_2S$) when exposed to an $H_2S$ atmosphere (10% by volume, 500 hours).

EXAMPLE III.3

Under stirring, 1.75 g of 0.1 N hydrochloric acid were added to a mixture of 23.63 g of GPTS and 4.17 g of tetraethoxysilane. After 1 minute, 2.60 g of the boehmite sol prepared according to Example III.1 were added to the resulting prehydrolysate, whereafter stirring was conducted for 1 hour at room temperature. Subsequently, a solution of 11.42 g of bisphenol A and 0.41 g of 1-methylimidazole in 15 g of butoxyethanol was added, whereafter stirring was continued for 30 minutes. The sol thus obtained could be applied onto substrate surfaces by means of the standard coating methods given in Example III.1; the thermal curing of the layers was conducted at 130° C. within 1 hour.

EXAMPLE III.4

To 4.73 g GPTS 1.08 g of 0.1 N hydrochloric acid were added under stirring, and thereafter 3 g of boehmite powder (Disperal® P3, Messrs. Condea) were added. After 24 hours of stirring at room temperature the solution was transparent. Then, 0.5 g of tridecafluorooctyl triethoxysilane were added and stirring was continued, followed by the addition of a mixture of 1.8 g of bisphenol A, 0.08 g of 1-methylimidazole and 5 g of butoxyethanol, and stirring for another 30 minutes. The coating material obtained could be applied onto surfaces of aluminum and magnesium, respectively by means of spray-coating and showed the same properties as described in Example II.3. Additionally, the layers showed wetting properties comparable to perfluorinated polymers, i.e., hydrophobic and oleophobic performance (anti-sticking properties, soil-repellent properties). The determined values of the contact angles were 112° for $H_2O$ and 53° for hexadecane.

EXAMPLE III.5

GPTS (23.64 g) was hydrolyzed at room temperature under stirring with 2.70 g of 0.1 N hydrochloric acid for 3 hours. To the prehydrolysate formed, 0.82 g of 1-methyimidazole and a solution consisting of 9.12 g of bisphenol A in 20 ml of ethanol were added also under stirring at room temperature. Thereafter, the sol was stirred at room temperature for 1 hour. The thermal curing of the layers was effected after application onto the desired substrate material at 130° C. within 1 hour.

EXAMPLE III.6

GPTS (23.64 g) was hydrolyzed with 2.70 g of 0.1 N hydrochloric acid at room temperature under stirring for 2 hours. To the prehydrolysate formed, 0.82 g of 1-methylimidazole as well as a solution consisting of 4.57 g of bisphenol A and 3.20 g of 1,5-dihydroxy-naphthalene in 20 ml of ethanol were added also under stirring at room temperature. The sol formed was stirred at room temperature for 1 hour. The thermal curing of the layers was effected after application onto the desired substrate material at 130° C. within 1 hour.

EXAMPLE III.7

A mixture of 23.64 GPTS and 1.79 g of 3-aminopropyl-trimethoxysilane was hydrolyzed with 2.70 g of 0.1 N hydrochloric acid at room temperature and under stirring for 2 hours. To the prehydrolysate formed, a solution of 9.12 g of bisphenol A in 20 ml of ethanol was added under stirring at room temperature. Then the sol was stirred at room temperature for 1 hour, and then further processed as described in Example III.5 and in Example III.6.

Layers on metallic surfaces, particularly of aluminum and magnesium, were highly transparent, showed high scratch and abrasion resistance (scratch hardnesses ranging from 30 to 45 g at layer thicknesses between 20 and 30 µm) and adhered very well to the surface. In salt spray tests (DIN 50021; 1000 hours) no changes in the properties of the material or delamination or optical changes, respectively were observed. On layers cut before the test, no corrosive infiltration could be determined which was evidence for the corrosion-inhibiting properties of said layers.

The above compositions were also employed for the coating of polymers. Layers on polycarbonate surfaces which showed excellent adhesion, very good scratch and abrasion resistance (e.g., scratch hardness of 50 g) and very good adhesion could be prepared, e.g., by dip-coating. The curing temperatures in this case were 90° C. (curing time 70 minutes).

IV. Preparation of nanoscale $ZrO_2$ and $TiO_2$ suspensions which can be employed (in the same amounts) in place of the boehmite sols used in the above examples In 50 ml of an ethanol/water mixture (1:1 by wt.), 0.5 g of $TiO_2$ (Messrs. Degussa, type P25; particle size about 30 nm) were suspended under stirring. Subsequently, 10 g of guanidinopropionic acid were added. After having refluxed the resulting mixture for 4 hours, 2.5 g of tetrabutyl ammoniumhydroxide were added, whereafter refluxing was continued for 2–3 hours. Then, a concentration operation to one half of the volume was conducted.

The above procedure was carried out with the following powders:

$Al_2O_3$ C (Messrs. Degussa; particle size 13 nm)

$ZrO_2$ VP (Messrs. Degussa; particle size 30 nm)

$TiO_2$ P25 (Messrs. Degussa; particle size 21 nm) and

TiN (H.C. Starck; particle size 30 nm).

What is claimed is:

1. Process for the production of compositions based on hydrolyzable silanes having epoxy groups, comprising:
   adding to said composition
   (i) a particulate material B selected from the group consisting of oxides, oxohydrates, nitrides and carbides of Si, Al, B and of transition metals, and having a particle size ranging from 1 to 100 nm; and optionally
   (ii) a surfactant C; and/or
   (iii) an aromatic polyol D having an average molecular weight not exceeding 1000; to at least one prehydrolyzed silicon compound A having at least one radical bonded directly to Si and not being removable hydrolytically and including an epoxide ring in the presence of a titanium alkoxide or aluminum tributoxyethanolate in an amount not exceeding 70% by moles based on the total of hydrolyzable compounds employed, provided that the hydrolysis of the silicon compound A may also be effected in the presence of said particulate material B.

2. Process according to claim 1 for the production of a composition for highly scratch-resistant coatings and molded bodies, characterized in that it comprises the combination of said particulate material B and said silicon compound A which is hydrolyzed or is to be hydrolyzed.

3. Process according to claim 1 for the production of a composition for long-term hydrophilic coatings and molded bodies, characterized in that it comprises the addition of at least one non-ionic surfactant C to said prehydrolyzed silicon compound A.

4. Process according to claim 1 for the production of a composition for corrosion-inhibiting coatings, characterized in that it comprises the addition of at least one aromatic polyol D to said prehydrolyzed silicon compound A.

5. Process according to claim 3, characterized in the additionally, said aromatic polyol D, as defined in claim 1 is added.

6. Process according to claim 1, characterized in that the silicon compound(s) A is (are) selected from compounds of the general formula (I):

$$R_3SiR'$$ (I):

wherein the radicals R, the same are different from each other, represent a hydrolyzable group, and R' is a glycidyloxy-$(C_1-C_6)$-alkylene radical.

7. Process according to claim 1, characterized in that said silicon compound(s) A is (are) hydrolyzed by using an acidic catalyst.

8. Process according to claim 1, characterized in that the particulate material B comprises boehmite.

9. Process according to claim 1, characterized in that said surfactant C is selected from those which are in liquid form at room temperature.

10. Process according to claim 1, characterized in that said aromatic polyol D is selected from diols having the general formulae (II) and (III):

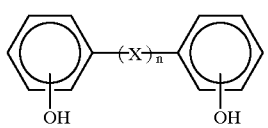

(II)

wherein X represents a $(C_1-C_8)$ alkylene or alkylidene radical, a $(C_6-C_{14})$ arylene radical, —O—, —S—, —CO— or —$SO_2$—, and n is 0 or 1; or

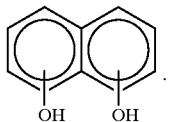

(III)

11. Composition based on hydrolyzable silanes having epoxy groups, obtained according to the process of claim 1.

12. A method of coating a glass or transparent plastic, comprising coating glass or transparent plastic using a composition prepared by the process of claim 1.

13. A method of coating a glass or transparent plastic, comprising coating glass or transparent plastic using a composition prepared by the process of claim 2.

14. A method of coating a glass or transparent plastic, comprising coating glass or transparent plastic using a composition prepared by the process of claim 3.

15. A method of coating a glass or transparent plastic, comprising coating glass or transparent plastic using a composition prepared by the process of claim 4.

16. The method according to claim 12, wherein said composition is applied to the surface of said glass or transparent plastic is cured thermally at a temperature of from 90° C. to 130° C. or is cured photochemically following the addition of a photoinitiator.

17. The method of claim 16 further comprising thermally post-curing said cured composition.

18. The process of claim 8, wherein said particulate boehmite has a particle size of 1 to 100 nm.

19. The process according to claim 8, wherein said particulate boehmite is in the form of a sol.

20. Process according to claim 1, carried out in the presence of a titanium alkoxide.

21. Process according to claim 1, carried out in the presence of an aluminum tributoxy ethanolate.

22. Process according to claim 1, characterized in that said surfactant C is selected from the group consisting of polyoxyethylene oleylethers, polyoxyethylene cetylethers, sodium laurylsulfate, laurylpyridinium chloride, polyoxyethylene sorbitan monooleate, and mixtures thereof.

23. Process according to claim 1, wherein the amount of titanium alkoxide or aluminum tributoxyethanolate is not more than 10% by moles based on the total of hydrolyzable compounds employed.

* * * * *

UNITED STATES PATENT AND TRADEMARK OFFICE
CERTIFICATE OF CORRECTION

PATENT NO. : 6,228,921 B1
DATED : May 8, 2001
INVENTOR(S) : Kasemann et al.

It is certified that error appears in the above-identified patent and that said Letters Patent is hereby corrected as shown below:

Title page, Item (30),
The Foreign Application Priority Data is incorrect. Item (30) should read:

(30) Foreign Application Priority Data
Nov. 10, 1993 (DE) .......................................43 38 361

Column 1,
First paragraph, the Related U.S. Application Data is incorrect. Column 1, first paragraph should read:

Division of 08/635,955 filed May 6, 1996 U.S. Pat. No. 6,008,285 which is 371 case of PCT/EP94/03336, filed Oct. 10, 1994.

Signed and Sealed this

Twenty-eighth Day of August, 2001

Attest:

NICHOLAS P. GODICI
*Attesting Officer*     *Acting Director of the United States Patent and Trademark Office*